(12) United States Patent  (10) Patent No.: US 8,347,796 B2
Udagawa et al.  (45) Date of Patent: Jan. 8, 2013

(54) FURNITURE COMPONENT FASTENING APPARATUS, FURNITURE SYSTEM AND METHOD OF ASSEMBLING FURNITURE FOR A WORK SPACE

(75) Inventors: Masamichi Udagawa, New York, NY (US); Sigrid Moeslinger, New York, NY (US); Wallace Bullwinkle, Gilbertsville, PA (US)

(73) Assignee: Knoll, Inc., East Greenville, PA (US)

( * ) Notice: Subject to any disclaimer, the term of this patent is extended or adjusted under 35 U.S.C. 154(b) by 0 days.

(21) Appl. No.: 13/152,530

(22) Filed: Jun. 3, 2011

(65) Prior Publication Data

US 2011/0298339 A1   Dec. 8, 2011

Related U.S. Application Data

(60) Provisional application No. 61/352,468, filed on Jun. 8, 2010.

(51) Int. Cl.
*A47B 3/06* (2006.01)
*A47B 47/00* (2006.01)
(52) U.S. Cl. ........... 108/155; 108/65; 312/277; 403/195
(58) Field of Classification Search .................. 312/194, 312/195, 223.3, 277, 203, 107, 108, 111; 108/155, 65, 158.11, 50.01, 50.02; 403/396, 403/386, 338, 188, 195, 196, 199, 384, 398, 403/399
See application file for complete search history.

(56) References Cited

U.S. PATENT DOCUMENTS

| 1,654,183 | A | 12/1927 | Mayer |
| 2,489,933 | A | 11/1949 | Schwarz |
| 2,495,632 | A | 1/1950 | Hansen et al. |
| 2,659,640 | A | 11/1953 | Lindman |

(Continued)

FOREIGN PATENT DOCUMENTS

DE   8619968   8/1988

(Continued)

OTHER PUBLICATIONS

International Search Report and Written Opinion, PCT/US2011/039065, International Filing Date Jun. 3, 2011 (11 pages).

*Primary Examiner* — Janet M Wilkens
*Assistant Examiner* — Hiwot Tefera
(74) *Attorney, Agent, or Firm* — Buchanan Ingersoll & Rooney PC

(57) ABSTRACT

A furniture system, method of assembling furniture for a work space, and a fastening apparatus for interconnecting furniture components include one or more fastening devices. Each fastening device includes a body that has a channel sized and configured to receive a first rail. Each fastening device also includes at least one of a connector assembly and an opening formed in the body for attaching the fastening device to at least one other furniture component. The connector assembly and the opening in the body are sized and configured so that the other furniture components are positioned such that at least one of their height and length extend in a direction substantially perpendicular to the length of the first rail, such as a direction that is mostly perpendicular to the length of the first rail. Other embodiments of the fastening device may include variations in configurations to the connector assembly or body.

18 Claims, 15 Drawing Sheets

U.S. PATENT DOCUMENTS

| | | | | |
|---|---|---|---|---|
| 3,175,642 A * | 3/1965 | Neeley | | 182/224 |
| 3,580,652 A * | 5/1971 | Nielsen | | 312/208.1 |
| 3,851,600 A | 12/1974 | Kohl | | |
| 3,985,083 A | 10/1976 | Pofferi | | |
| 4,101,183 A * | 7/1978 | McManus | | 312/195 |
| 4,105,351 A | 8/1978 | Anderson | | |
| 4,382,642 A * | 5/1983 | Burdick | | 312/194 |
| 4,748,913 A * | 6/1988 | Favaretto et al. | | 108/50.02 |
| 4,884,513 A * | 12/1989 | Newhouse et al. | | 108/50.02 |
| 4,974,913 A * | 12/1990 | Vogt et al. | | 312/195 |
| 5,072,880 A * | 12/1991 | McCloud | | 273/108.52 |
| 5,205,223 A * | 4/1993 | Ball et al. | | 108/124 |
| 5,638,759 A * | 6/1997 | Klugkist | | 108/50.02 |
| 5,957,062 A * | 9/1999 | Cox et al. | | 108/133 |
| 6,024,024 A * | 2/2000 | Favaretto | | 108/64 |
| 6,029,587 A * | 2/2000 | Rozier et al. | | 108/147.21 |
| 6,302,035 B1 * | 10/2001 | Frenkler et al. | | 108/102 |
| 6,305,868 B1 * | 10/2001 | Kinoshita et al. | | 403/49 |
| 6,725,784 B2 * | 4/2004 | Crinion | | 108/64 |
| 6,742,307 B2 | 6/2004 | Briskman | | |
| 6,786,672 B2 * | 9/2004 | Ledingham | | 403/400 |
| 6,986,556 B2 * | 1/2006 | Haberman | | 312/223.3 |
| 7,004,081 B2 * | 2/2006 | Chang | | 108/50.01 |
| 7,090,427 B2 * | 8/2006 | Petratto | | 403/400 |
| 7,111,564 B2 * | 9/2006 | Chang | | 108/155 |
| 7,398,621 B2 * | 7/2008 | Banta | | 52/93.1 |
| 7,406,803 B2 * | 8/2008 | Haberman | | 52/236.1 |
| 7,694,924 B2 * | 4/2010 | Magnusson | | 248/188.1 |
| 7,703,400 B2 * | 4/2010 | Mockel | | 108/115 |
| 7,757,510 B2 * | 7/2010 | Rosete et al. | | 62/298 |
| 7,878,128 B2 * | 2/2011 | Watson et al. | | 108/132 |
| 2004/0033103 A1 * | 2/2004 | Ludwig et al. | | 403/188 |
| 2004/0194670 A1 * | 10/2004 | Lai | | 108/50.02 |
| 2007/0137797 A1 * | 6/2007 | Long et al. | | 160/135 |
| 2009/0190996 A1 * | 7/2009 | Clarke | | 403/188 |

FOREIGN PATENT DOCUMENTS

| | | |
|---|---|---|
| DE | 4437228 | 4/1996 |
| EP | 0940588 | 9/1999 |
| EP | 1008315 | 6/2000 |
| EP | 2166170 | 3/2010 |
| WO | 2005/018383 | 3/2005 |
| WO | 2007118864 | 10/2007 |

* cited by examiner

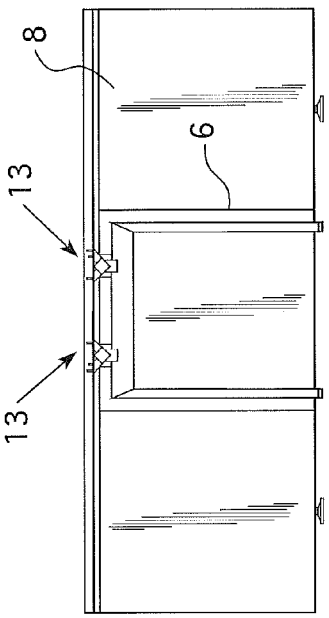
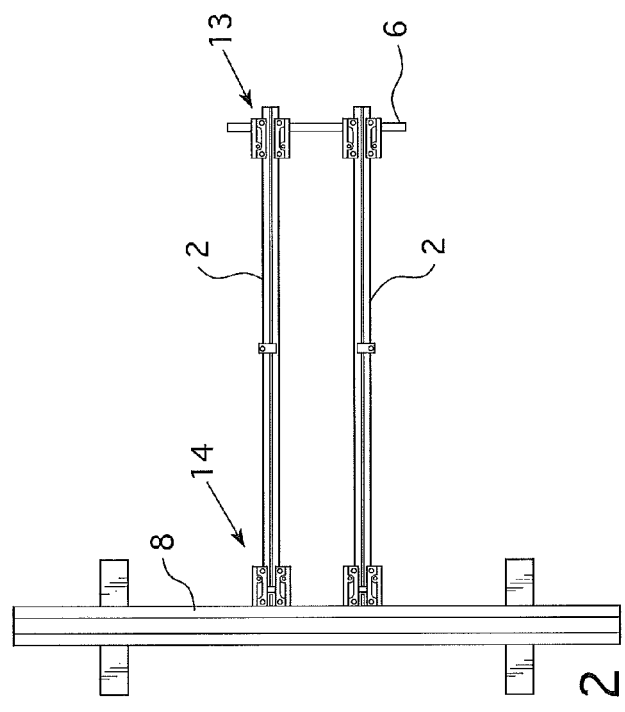
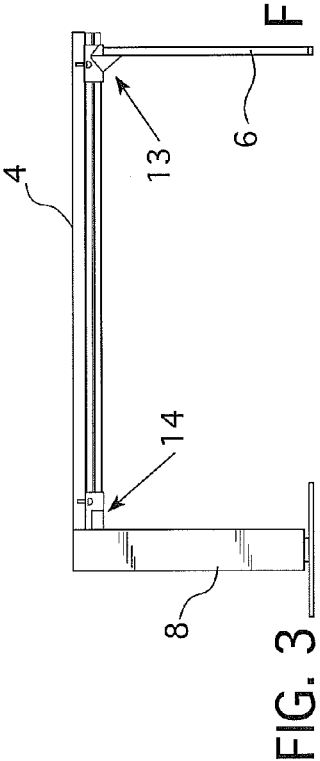

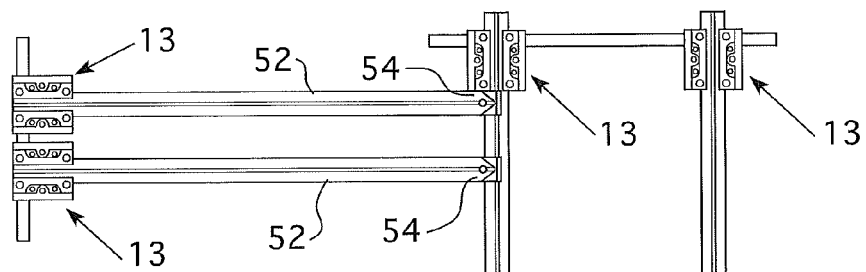
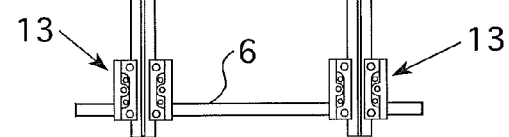
FIG. 13
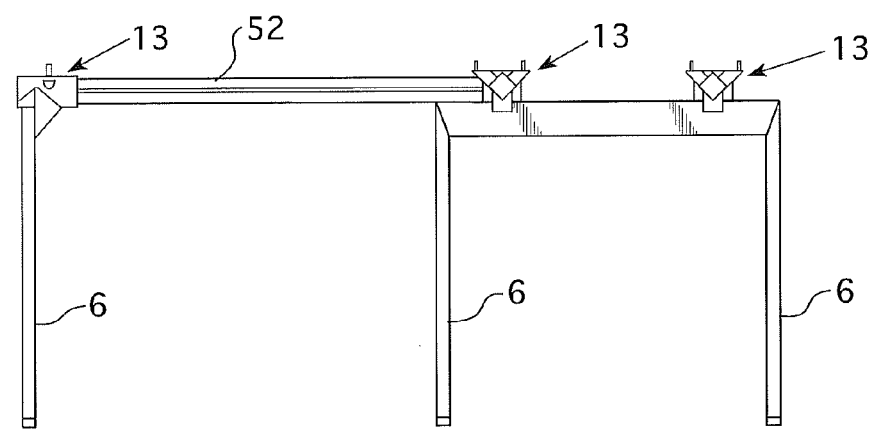
FIG. 15

US 8,347,796 B2

FURNITURE COMPONENT FASTENING APPARATUS, FURNITURE SYSTEM AND METHOD OF ASSEMBLING FURNITURE FOR A WORK SPACE

CROSS REFERENCE TO RELATED APPLICATION

The present application claims priority to U.S. Provisional Patent Application Ser. No. 61/352,468, which was filed on Jun. 8, 2010. The entirety of U.S. Provisional Patent Application Ser. No. 61/352,468 is incorporated by reference herein.

FIELD OF THE INVENTION

The present invention is related to furniture and, more particularly, to mechanisms for interconnecting furniture components and furniture fastening systems.

BACKGROUND OF THE INVENTION

Furniture components may be interconnected to form an article of furniture, such as a chair or a table. Typically, systems are not provided for creating or forming furniture such as office furniture. Nor are mechanisms commonly used for providing a common mechanism for fastening different furniture together to form office work spaces.

For example, if an office is set up to include a set of cubicles. A paneling system is often used to create barriers between office spaces. Separate table components or desk components are often positioned in each defined office space. Such desks or tables are often separate from the panels used to define the office spaces. Cabling may be provided via a cabling system or wire management system attached to the panels or provided with the panels. Often, many of the articles of furniture used in an office space are separately positioned within that space and separate from other articles of furniture. To the extent any articles are interconnected, they are usually interconnected using screws or bolts that directly attached articles of furniture together. For instance, a panel portion may be fastened to a desk top by a clamp and/or screws.

A furniture system that utilizes a furniture component fastening mechanism for interconnecting different articles of furniture together may be appreciated from WIPO Publication No. WO/2007/118864. That publication discloses a furniture system that utilizes furniture components configured to provide a groove having a particular profile for receiving a fastening device and a fastening device configured to interconnect different furniture components by mating with those profiles. The fastening component may be provided as a portion of an article of furniture, such as a drawer, desk, or paper holder. The fastening mechanism may alternatively be a clip mechanism for interconnecting different furniture components by being interconnected to the profiled grooves on each component. Such a furniture system and fastening mechanism may provide a quick connection and allow an installer to quickly build or reposition cubicles or office space. However, the reliance on the mating grooves being defined along edges of different articles of furniture and fastening devices that utilize a mating component that matingly connects to that groove. Such a design requirement can provide some limitations to furniture system designs or office space designs that utilize such a system.

Other furniture may include a support assembly for a work surface that is securable to a gable. For instance, U.S. Pat. No. 7,694,924 discloses a support assembly that may support a work surface. The support assembly may include a horizontal support with a cross-sectional shape and a saddle support that supports the work surface. Such a system may be used to assemble tables utilizing a relatively small number of fasteners. However, such a fastening device is only utilized for supporting table tops, or work surfaces.

A new furniture system and fastening mechanism that may be used in such a system is needed. Such a system preferably permits a relatively quick installation or fabrication of cubicles or work space for offices, rooms or other locations. Such a system and fastening mechanism may also preferably permit a wide array of connection possibilities for interconnecting a wide variety of articles of furniture.

SUMMARY OF INVENTION

A fastening apparatus for interconnecting different furniture components of a furniture system is provided that includes at least one fastening device. The one or more fastening devices may include a body and at least one of a connector assembly and an opening formed in the body. The one or more fastening devices may include a body that at least partially defines a first channel that is sized and configured to receive a first elongated rail of a first furniture component. The first elongated rail has a length that defines a longest dimension of the first elongated rail. The first channel is sized and configured to receive and hold a portion of the first elongated rail so that the first elongated rail is positionable in a substantially horizontal position to support at least a portion of a first work surface. The connector assembly may be attached to the body and may have one or more elements that are sized and configured to attach to a second furniture component so that the second furniture component is positionable such that at least one of a length of the second furniture component and a height of the second furniture component extends in a direction that is substantially perpendicular to the length of the first elongated rail when that rail is in a substantially horizontal position. The opening formed in the body may be below the first channel and is sized and configured to receive a portion of a third furniture component so that the third furniture component is positionable such that at least one of a length of the third furniture component and a height of the third furniture component extends in a direction that is substantially perpendicular to the length of the first elongated rail when the first elongated rail is in a substantially horizontal position.

It should be appreciated that embodiments of the fastening apparatus may include one or more fastening devices that only include a connector assembly or only include an opening formed in the body. Of course, it is contemplated that other embodiments of the one or more fastening devices may include both the connector assembly and the opening formed in the body.

It should be appreciated that a substantially horizontal position may include a horizontal position or a position that is mostly horizontal. For instance, a rail that may extend along its length at a 1 degree incline, 0.5 degree incline, a 0.5 degree decline or a 1.0 degree decline relative to perfectly horizontal may be in a position that is substantially horizontal. Similarly, a substantially perpendicular arrangement may be a position that provides one component to be arranged perpendicular or almost perpendicular to another component. For example, a first rail that has a length extend in one direction may have a length that is perpendicular to the length of a second rail that has its length extend in a direction that is 85 degrees, 88 degrees, or 89 degrees relative to the length of the first rail.

In some embodiments, the first furniture component may be a desk or a table, the first work surface may be a table top, a desk top or another planar member that provides a surface for supporting work equipment such as documents, computers, staplers, lights or other tools or equipment. The first rail may be a bar, member, pole or rod composed of metal, a composite material, a polymeric material or a ceramic material. The second and third furniture components may be, for example, a drawer unit, a fence, a panel, a screen, a support assembly such as a set of table legs, or other furniture component.

Embodiments of the fastening apparatus may also include one or more jaw connectors. Each jaw connector may include an upper jaw portion, a lower jaw portion and a rail receiving portion. The upper jaw portion may be spaced apart from the lower jaw portion so that a portion of the first elongated rail is receivable between the upper and lower jaw portions. The upper and lower jaw portions may be attached to the rail receiving portion. The rail receiving portion may define or have an opening that is sized and configured to receive an end portion of a second elongated rail. The end portion of the second elongated rail may be receivable within the opening so that the length of the second elongated rail extends in a direction that is substantially perpendicular to the length of the first elongated rail. The end portion of the second elongated rail is positionable in the opening so that the second elongated rail is positionable in a substantially horizontal position to support at least a portion of a second work surface. The second work surface may be, for example, a table top or a planar member that provides a surface for supporting work equipment such as documents, computers, staplers, lights or other tools or equipment.

Preferably, the body of each fastening device is composed of metal or a polymeric material and the connector assembly is composed of metal or a polymeric material. The first channel may have opposite ends located on opposite sides of the body. The rail receiving portion may define the opening such that a mouth of the opening faces a direction that is perpendicular to the ends of the first channel. Preferably, the first channel extends linearly between the ends and has a generally polygonal shape or a V-shaped profile.

The one or more elements of the connector assembly may include a plurality of portions. For example, a first portion may be sized and configured to mate within an opening defined in the second furniture component and a second portion may be sized and configured to be attached within an aperture formed in a portion of the body that is located below the first channel. The first and second portions may be integrally attached to each other such that the portions are portions of a unitary structure of may be separate components that are interconnected by a fastening mechanism such as one or more fasteners like screws, bolts or magnets or an adhesive.

Embodiments of the one or more fastening devices may also include one or more clamping members that are positionable within the first channel to engage the portion of the first elongated rail when that portion is held within the first channel. A covering member or a plate member may also be attached or attachable to the body to cover the first channel and the one or more clamping members. An exterior surface of that covering member or plate member may be sized and configured to support a portion of the first work surface. That exterior surface of the cover plate may be a friction inducing surface for supporting and positioning the first work surface. In alternative embodiments, an upper portion of each clamping member may be sized and configured for directly engaging and supporting a work surface.

In some embodiments, the connector assembly may be a member sized and configured for positioning between the body and the second furniture component for attachment to the second furniture component. At least one fastener may also be positioned within the second furniture component and the member to attach the member to the second furniture component. That one or more fastener may include a plurality of magnets or may be one or more bolts or screws or an adhesive.

A method of assembling furniture for a work space is also provided. A plurality of first elongated rails may be provided. Each first rail has a length that defines a longest dimension of that rail. A plurality of fastening devices may also be provided. Each fastening device may include a body and at least one of a connector assembly and an opening formed in the body below the first channel. The body may have a first channel sized and configured to receive a portion of one of the first elongated rails. The first channel may be sized and configured to hold a portion of the first elongated rail so that the first elongated rail is positioned in a substantially horizontal position to support at least a portion of a first work surface. The connector assembly may be attached to the body and have one or more elements sized and configured to attach to a second furniture component such that the second furniture component is positionable so that at least one of a length of the second furniture component and a height of the second furniture component extends in a direction that is substantially perpendicular or perpendicular to the length of the first rail when the first rail is in the substantially horizontal or horizontal position. The opening formed in the body may be sized and configured to receive a portion of a third furniture component so that the third furniture component is positionable so that at least one of a length of the third furniture component and a height of the third furniture component extends in a direction that is substantially perpendicular to the length of the first elongated rail when the first elongated rail is in the substantially horizontal position. The first rails may be positioned so that a portion of each first elongated rail is positioned in the first channel of a respective fastening device of the plurality of fastening devices. A first work surface may be positioned so that the first work surface is at least partially supported by the first rails. At least one of the second furniture component and third furniture component may be attached to at least one of the fastening devices so that at least one of a length of the second furniture component and a height of the second furniture component, a length of the third furniture component and a height of the third furniture component extends in a direction that is substantially perpendicular to the length of the first elongated rails.

The second furniture component may be a panel or a drawer unit or a support assembly. The third furniture component may be a panel or a drawer unit or a support assembly. Of course, the second furniture component and third furniture component may also be other furniture or other portions of furniture.

It should be appreciated that the connector assembly may include any of a number of configurations such as embodiments discussed above or other variations to such embodiments. The opening formed in the body may also include any of a number of configurations for receiving or holding portions of furniture.

Preferably, each rail has a rectangular or square cross section. Of course, rails may have other polygonal shaped cross sections or have circular, elliptical or other curved cross sections as well.

Embodiments of the method may also include providing one or more jaw connector, attaching at least one second elongated rail to the one or more jaw connectors and positioning a second work surface over the one or more second rails so that a side of the second work surface is adjacent to or abuts a side of the first work surface.

A furniture system is also provided. The furniture system may include a first elongated rail, a first furniture component, a first work surface and one or more fastening devices. One or more brackets and one or more jaw connectors may also be provided in embodiments of the system.

The brackets that may be used in some embodiments of the furniture system may each include a body that defines an aperture that is sized and configured to receive and hold a portion of a first elongated rail to support a furniture component from the first rail when that furniture component is attached to the one or more brackets and those one or more brackets are positioned on the first rail.

Other details, objects, and advantages of the invention will become apparent as the following description of certain present preferred embodiments thereof and certain present preferred methods of practicing the same proceeds.

BRIEF DESCRIPTION OF THE DRAWINGS

Present preferred embodiments of our furniture system, fastening apparatus for interconnecting furniture components and methods of making and practicing the same are shown in the accompanying drawings. It should be appreciated that like components or like parts may be indicated by the same reference number throughout the different drawings.

FIG. 2 is a top view of the first present preferred embodiment of a system of furniture illustrated in FIG. 1.

FIG. 3 is a side view of the first present preferred system of furniture.

FIG. 4 is an end view of the first present preferred system of furniture

FIG. 13 is a top view of the fourth present preferred furniture system with the work surfaces removed.

FIG. 15 is an end view of the fourth present preferred furniture system with the work surfaces removed.

DETAILED DESCRIPTION OF PRESENT PREFERRED EMBODIMENTS

Figure 1:
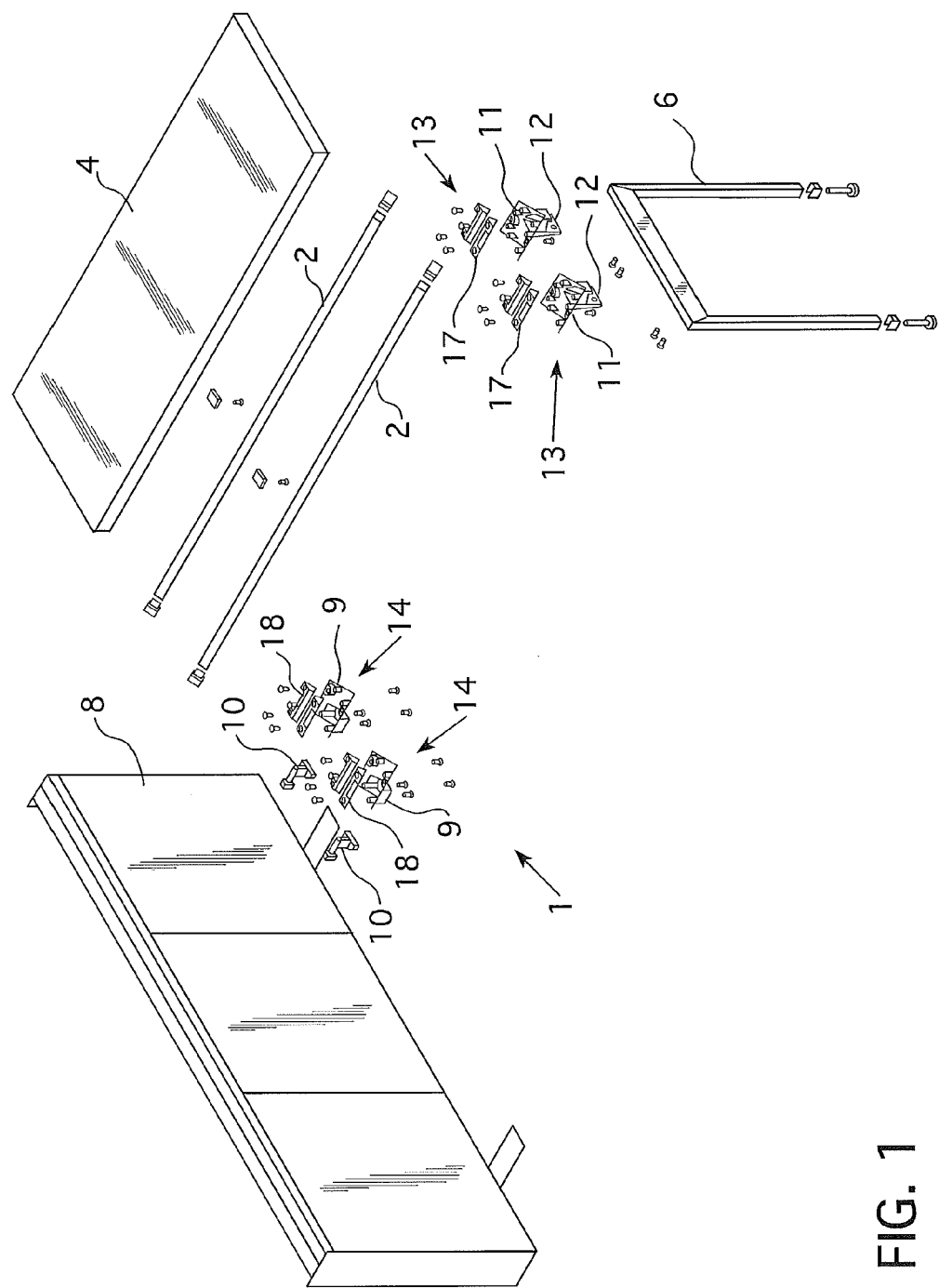
FIG. 1 is an exploded view of a first present preferred system of furniture illustrating a present preferred work space being interconnected to a present preferred panel. It should be appreciated that the panel may include a wire management channel located therein or may be configured for attachment to a wire management mechanism such as a wire management tray or wire management support device.

Referring to FIGS. 1-4, 16 and 17, a furniture system 1 may include elongated rail elements 2 that are supported on a support assembly 6 and a panel 8. The panel 8 may be a panel of a cubicle paneling system that is sized and configured to define work spaces or offices within a room. A work surface 4, such as a table top may be positioned on the rails 2. The table top surface 4 may be a glass surface or may be a surface composed of other material such as a polymeric material, composite material, ceramic material, metal or wood. The support assembly 6 may be a unitary structure that defines two legs and horizontal member extending between the upper ends of the top legs for supporting a portion of the rails 2 and work surface 4. In alternative embodiments, the support assembly 6 may be formed by an interconnection of such components or may include other structural elements configured to support the work surface 4 and rails 2.

A plurality of first fastening devices 14 may be provided for attaching the rails 2 to the panel 8. A plurality of second fastening devices 13 may be provided for attaching the rails 2 to the support assembly 6.

Each of the first fastening devices 14 may include a body 9 that defines a channel for receiving an end of a respective rail 2. The channel may be a groove, a bore or an elongated opening. Preferably, the shape of the channel permits receiving rails 2 that have a polygonal shaped cross section, such as a square, diamond or rectangular cross section. Clamping members 18 may be attached to the body 9 for engaging a portion of the rail 2 positioned in the channel to hold the rail 2 within the body 9. The body 9 of each first fastening device may also include an opening below the channel that is sized and configured for attachment to a portion of a connector assembly 10. An upper portion of each clamping member 18 may be sized and configured to directly support a portion of a work surface. In alternative embodiments, a cover or portion of the body 9 may be sized and configured to support or directly engage and support a portion of a work surface.

The connector assembly 10 may also include an element sized and configured to extend from the body 9 to which it is attached and matingly attach to a groove formed in the panel 8. The panel 8 is attached to the connector assemblies 10 such that the height and length of the panel extend in directions that are perpendicular or substantially perpendicular to the lengths of the rails 2.

Each of the second fastening devices 13 includes a body 11 that at least partially defines a channel for receiving an end portion of a respective rail 2. Each body 11 also defines an opening 12 that is sized and configured to matingly attach to a portion of the support assembly 6. As may be appreciated from FIGS. 2-4, each opening 12 may be sized and configured to mate with a portion of the support assembly to attach the second fastening device 13 to the support assembly 6. Preferably, that portion is a horizontal or substantially horizontal member that is a component of the support assembly 6. Clamping portions 17 are attachable to the body 11 for clamping a portion of a rail 2 that may be positioned within the channel of the body 11. An upper portion of each clamping portion 17 may be sized and configured to directly support a portion of a work surface. In alternative embodiments, a cover or portion of the body 9 may be sized and configured to support or directly engage and support a portion of a work surface.

Preferably, each rail 2 has a square or rectangular cross section and each channel defined within the bodies 12, 9 of the fastening devices 13 and 14 are square or rectangular in shape to receive portions of the rails 2. The bodies 9, 11 may be composed of steel or may be composed of other materials as well such as composite material, polymeric material, ceramic material, or an alloy or some other type of metal such as aluminum, iron, zinc or stainless steel. The connector assemblies 10 may also be composed of steel, but may be composed of other materials as well such as composite material, polymeric material, ceramic material, or an alloy or some other type of metal such as aluminum, iron or stainless steel.

Figure 5:
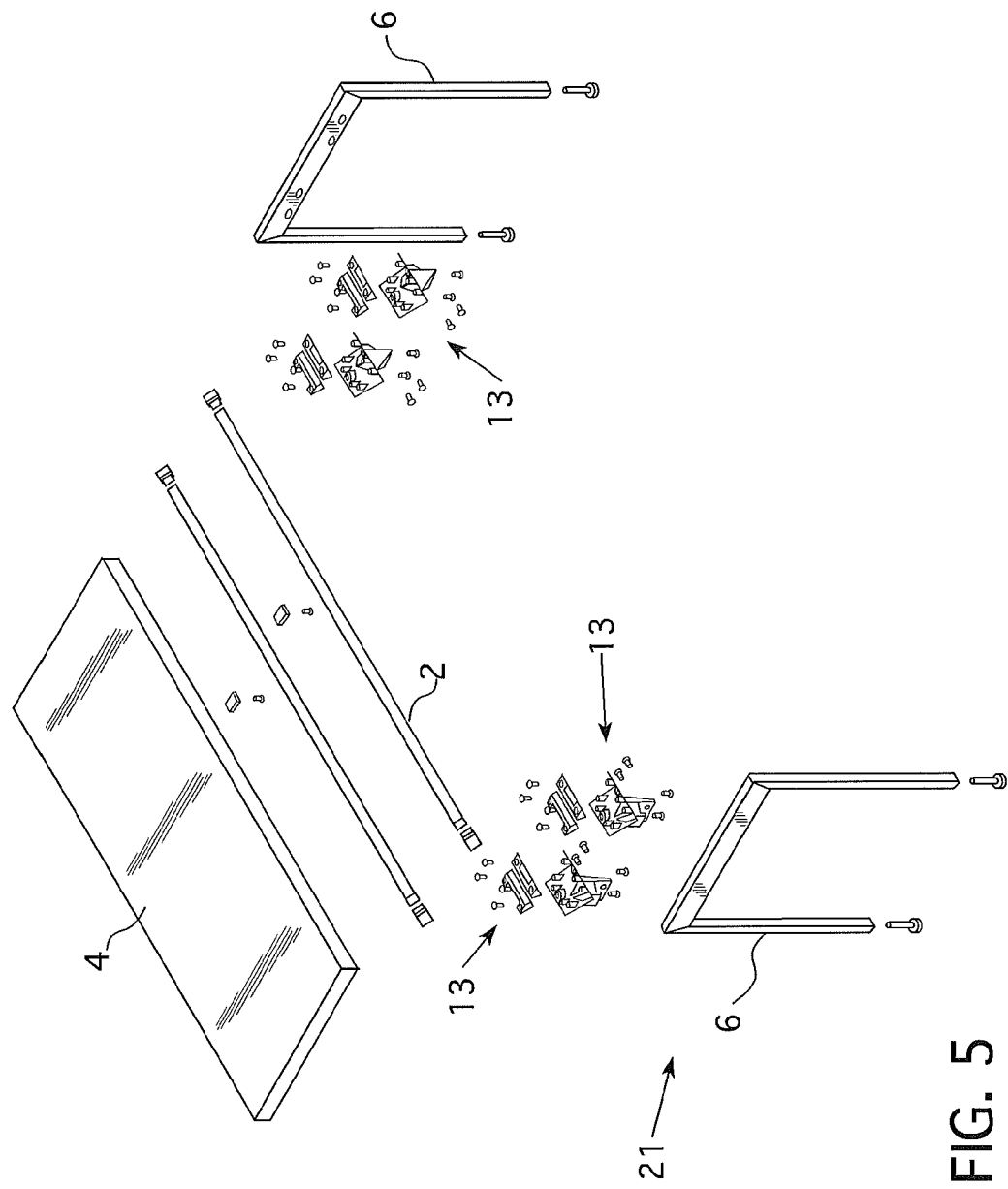
FIG. 5 is an exploded view of a first present preferred table that includes a first present preferred work surface.
Figure 6:
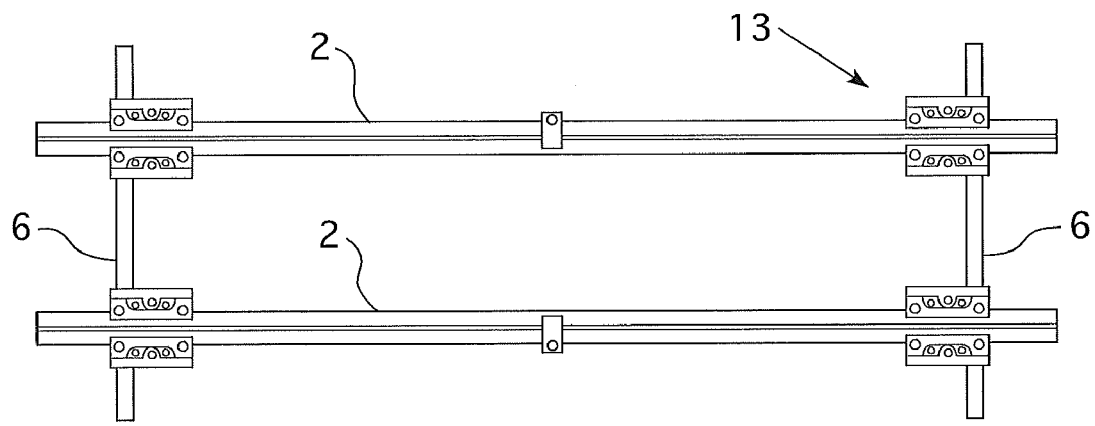
FIG. 6 is a top view illustrating the first present preferred table without having a work surface attached thereon.
Figure 7:
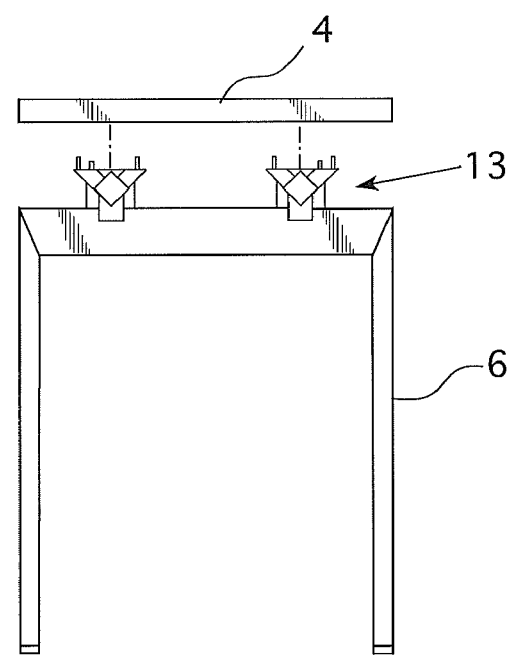
FIG. 7 is an end view of the first present preferred table.

Referring to FIGS. 5-7, a table 21 is illustrated that has a work surface 4 supported on rails 2 attached to support assemblies 6 via fastening devices 13. The fastening devices 13 may be attached to the support assemblies via openings 12 in the bodies 11 of the fastening devices. The channel formed in each body may receive a portion of each rail 2 to attach the rails to the fastening devices. The use of the fastening devices may permit the table 21 to be easily constructed. This is particularly true if the support assemblies 6 are unitary structures that have adjustable feet attached to the legs of the support assembly as shown in FIGS. 5-7. An installer only has to position the fastening device 13 and attach the fastening devices 13 to the rails and support assemblies to build or install the table 21. Additional fasteners may be used to attach an upper plate to the fastening devices 13 for engaging a bottom portion of the work surface to help support the work surface.

It should be understood that use of the fastening devices may permit furniture systems to be assembled without the use of a number of different fastening mechanisms or fasteners and may minimize the time needed for providing carpentry skills or other labor required for organizing and assembling furniture for an office work space. Preferably, embodiments of the furniture system are configured so that a worker or installer only has to use fasteners for interconnecting portions of the fastening devices together through holes formed in components of the fastening devices. Such a configuration permits an installer to easily provide a select number of fasteners such as bolts or screws during installation and avoids the need for providing substantial drilling of components or other assembly work.

Further, the use of such fastening devices may permit a work space to be easily readjusted to a different configuration. For example, if a particular work space needs to be rearranged, an installer may easily readjust the positioning of different furniture components by simply disconnecting the fastening devices necessary to move or adjust a position of a particular furniture component. Such functionality may permit reorganizing or rearranging of work spaces to occur more quickly and efficiently.

Figure 8:
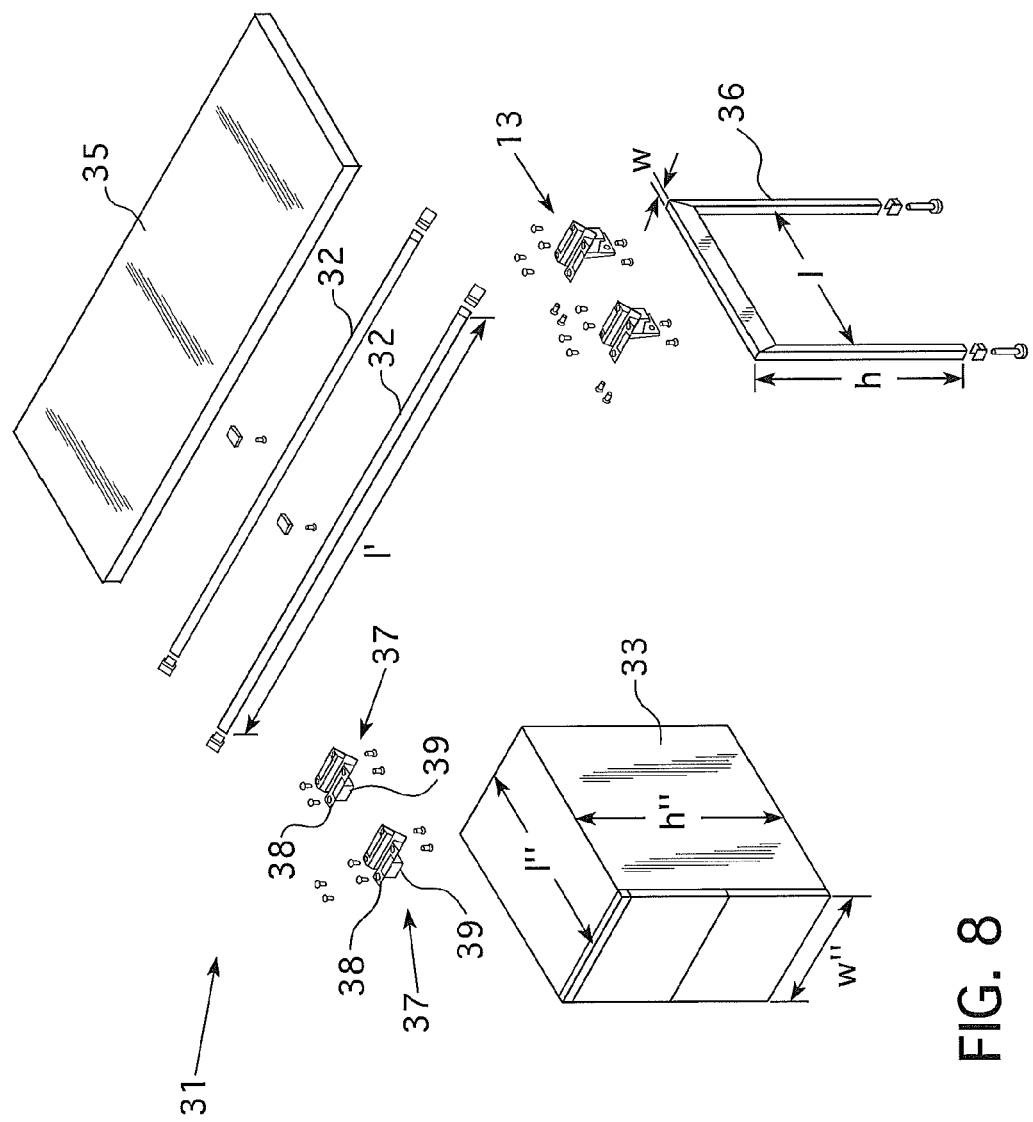
FIG. 8 is an exploded view of a second present preferred embodiment of a furniture system that utilizes a present preferred work surface being interconnected to a present preferred drawer and a table support via present preferred embodiments of fastening mechanisms that may be utilized in embodiments of the furniture system.
Figure 9:
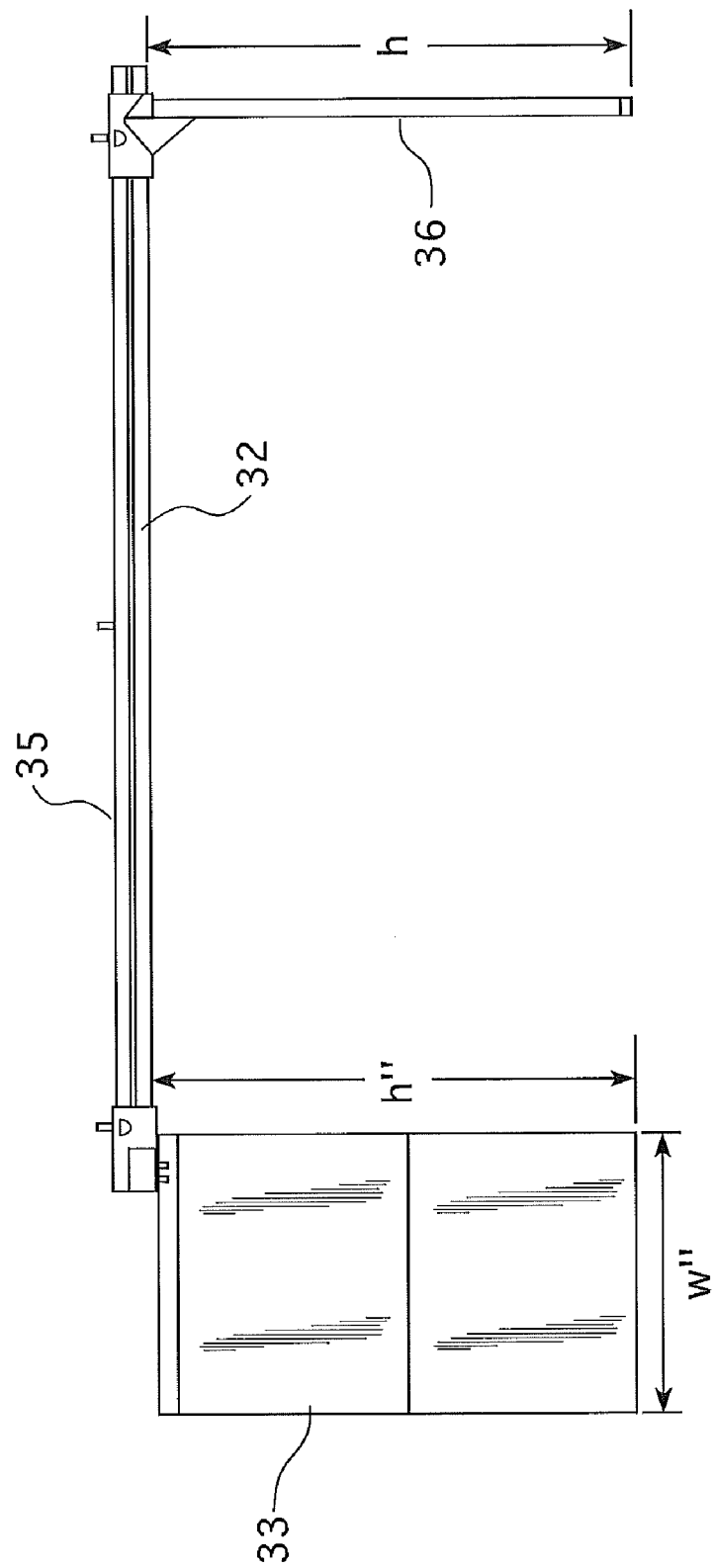
FIG. 9 is a side view of the second present preferred furniture system.

Referring to FIGS. 8-9, a furniture system may also include an arrangement of furniture components configured to provide a work space that includes a drawer unit 33 for organizing paper work and a work surface 35 for supporting work related equipment such as a computer and also provide a surface for a worker to read papers or prepare work related documents or a device the worker may need to make or repair. The drawer unit 33 may be, for example, a cabinet, a set of drawers, a file cabinet, a door cabinet, or a support that includes one or more shelves or drawers.

The work surface 35 may be supported on rails 32 that are attached to the drawer unit 33 and a support assembly 36. The support assembly 36 may be similar to support assembly 6 discussed above with reference to FIGS. 1-7. A fastening device 13, which may be similar to the fastening devices 13 discussed above with reference to FIGS. 1-7 may attach one end of each rail 32 to the support assembly 36.

It should be appreciated that the support assembly 36 has a length 1, a width w, and a height h. The legs of the support assembly may extend along the height h in a direction that is perpendicular to the length 1' of the rails 32. The horizontal member that interconnects the legs of the support assembly may extend along the length of the legs in a direction that is also perpendicular to the length of the rails 32.

Another set of fastening devices 37 are attached to the rails 32 at ends opposite the ends attached to the fastening devices 13. The second set of fastening devices 37 each include a body 38 that includes a channel sized and configured to receive portions of a respective rail 32 for attaching the rails 32 to the fastening devices 37. A lower portion of the body 39 extends below the channel of each fastening device 37 to support the rails on the drawer unit 33. Each lower portion of the body 39 may include a member that is either attached to the body 38 or is integral with the body 38. That body may include one or more bores or apertures for receiving fasteners that may extend from an upper surface of the drawer unit 33 into the lower portion 39 for attaching the drawer unit 33 to the fastening devices 37.

In alternative embodiments, the drawer unit 33 may engage the bottom portion 39 of the fastening devices 37 to support the fastening devices 37, a portion of the rails 32 and a portion of the work surface 35. For such embodiments, magnets or other fastening mechanisms may be utilized to attach the lower portion 39 of the fastening devices to the drawer unit 33.

The drawer unit 33 has a height h", a length l", and a width w". The height extends in a direction that is perpendicular to the length l' of the rails 32. The length l" of the drawer also extends in a direction that is perpendicular to the rails 32. The drawer unit 33 may include one or more moveable drawers that are moveable attached therein.

Figure 10:
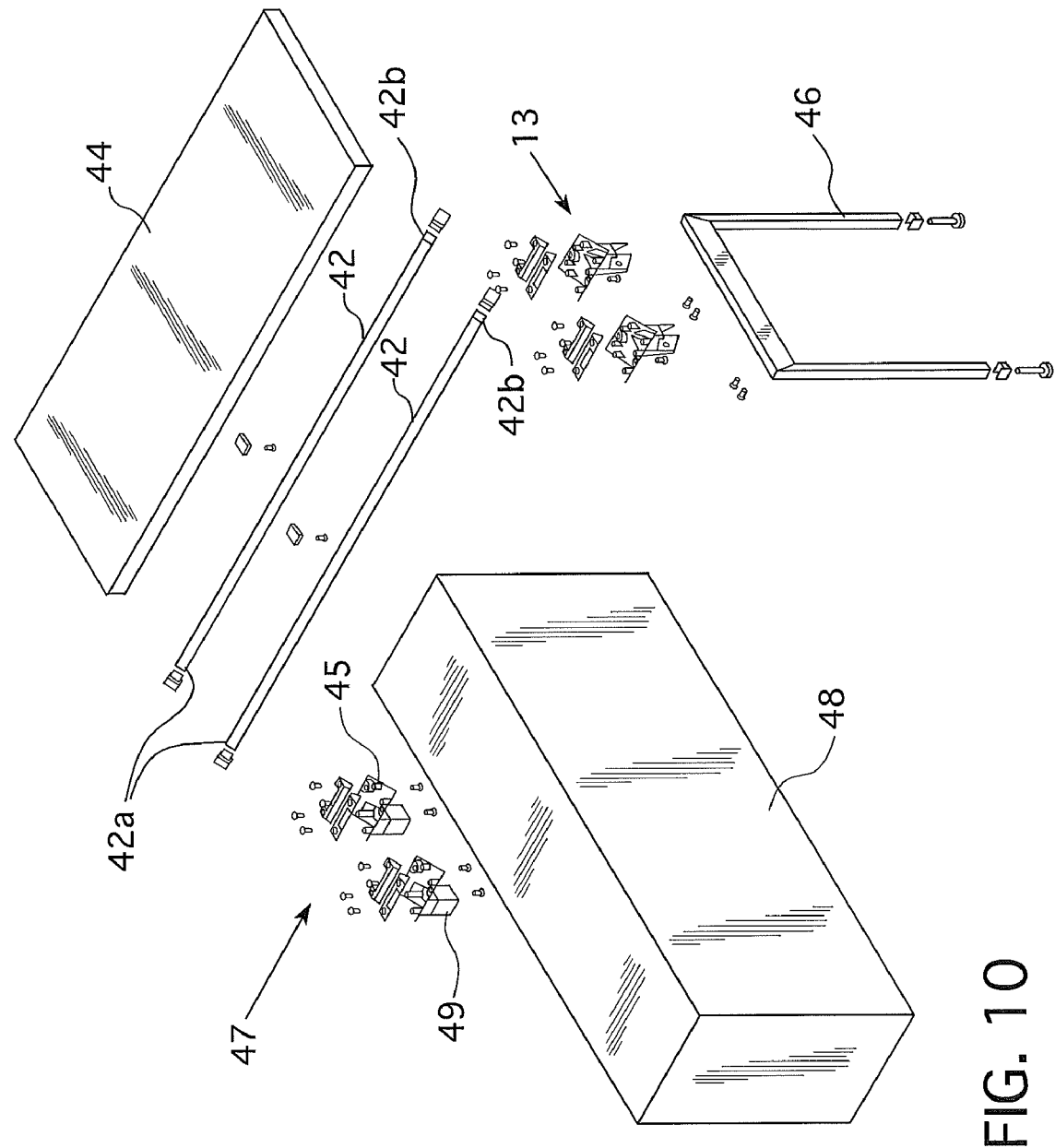
FIG. 10 is an exploded view of a third present preferred embodiment of a furniture system that utilizes a present preferred work surface being interconnected to a present preferred drawer and a table support via present preferred embodiments of fastening mechanisms that may be utilized in embodiments of the furniture system.
Figure 11:
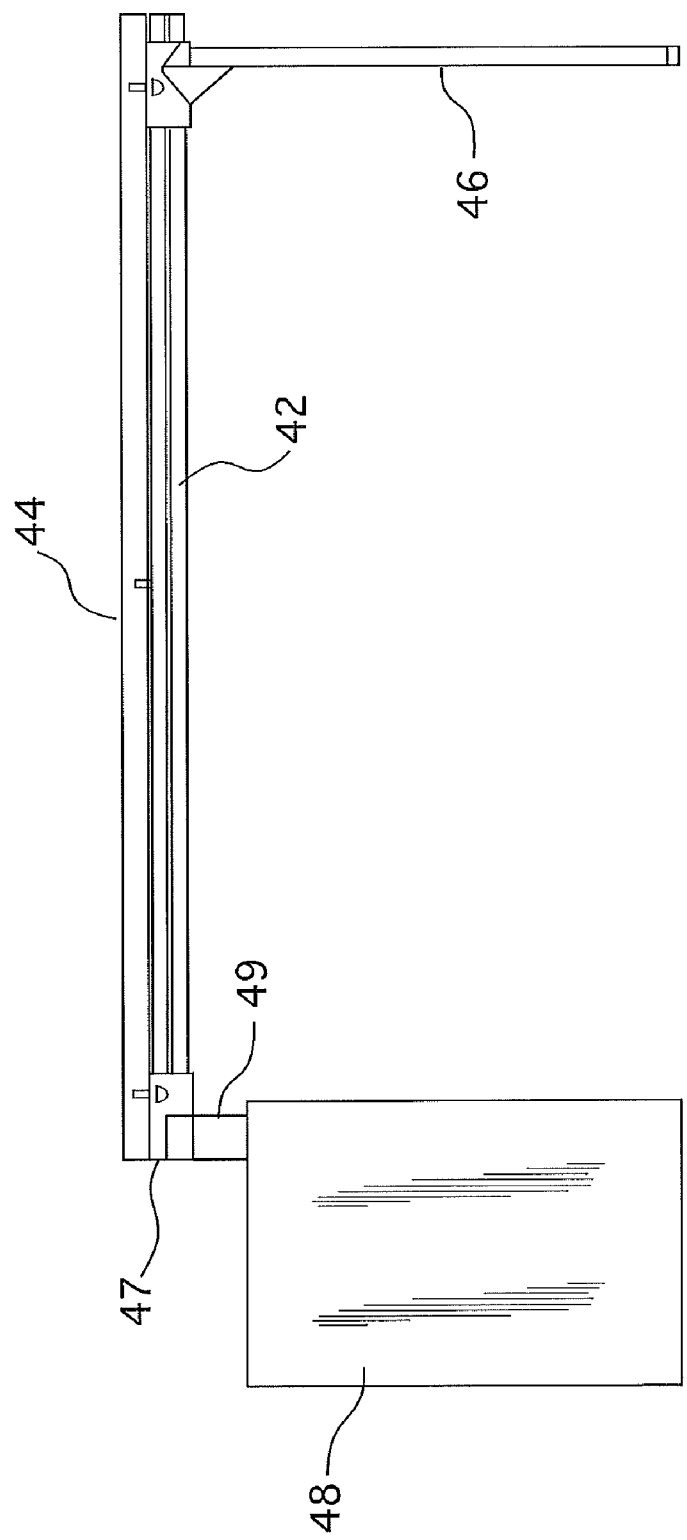
FIG. 11 is a side view of the third present preferred embodiment of a furniture system.
Figure 12:
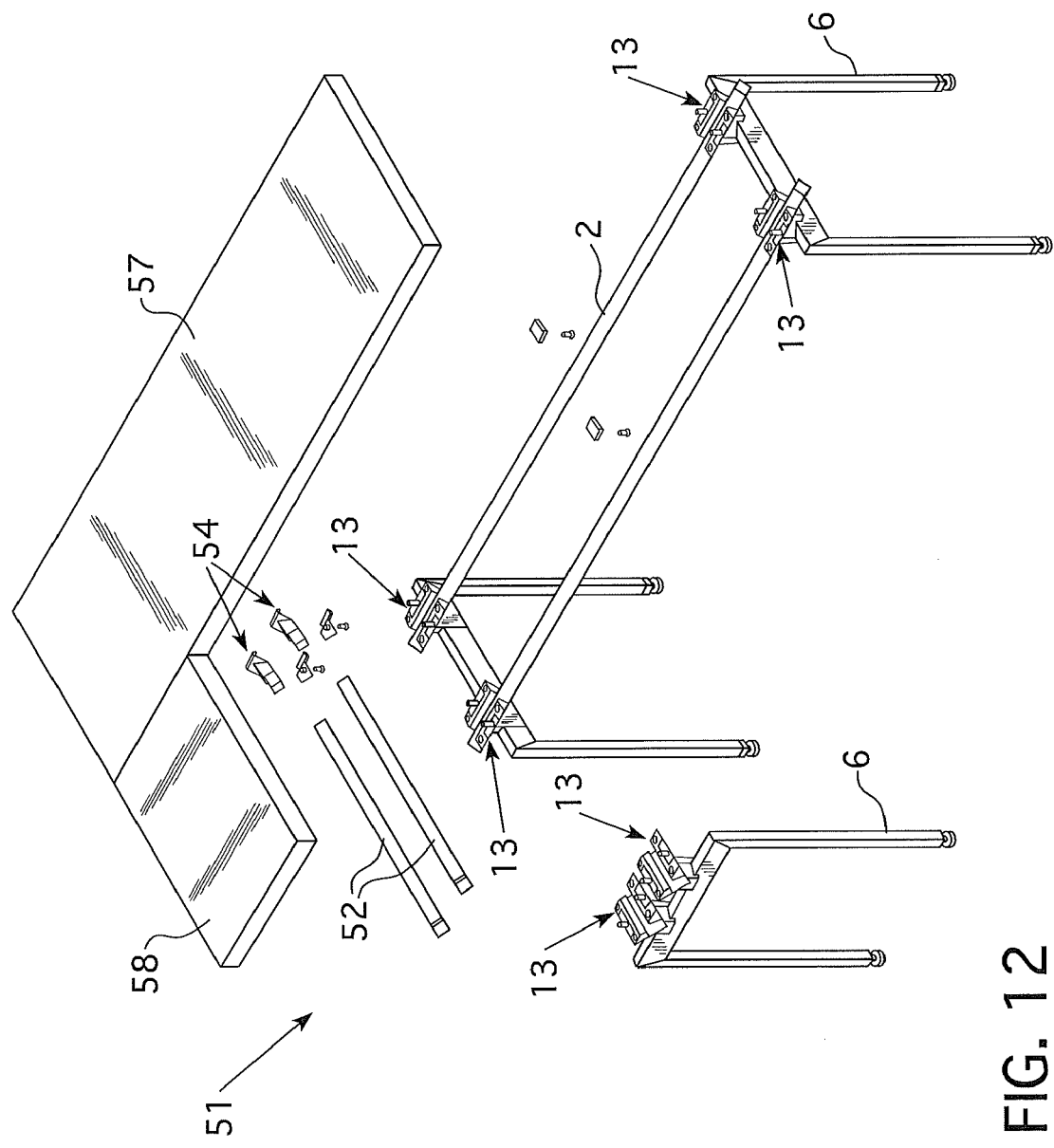
FIG. 12 is an exploded view illustrating a fourth present preferred embodiment of a furniture system.
Figure 18:
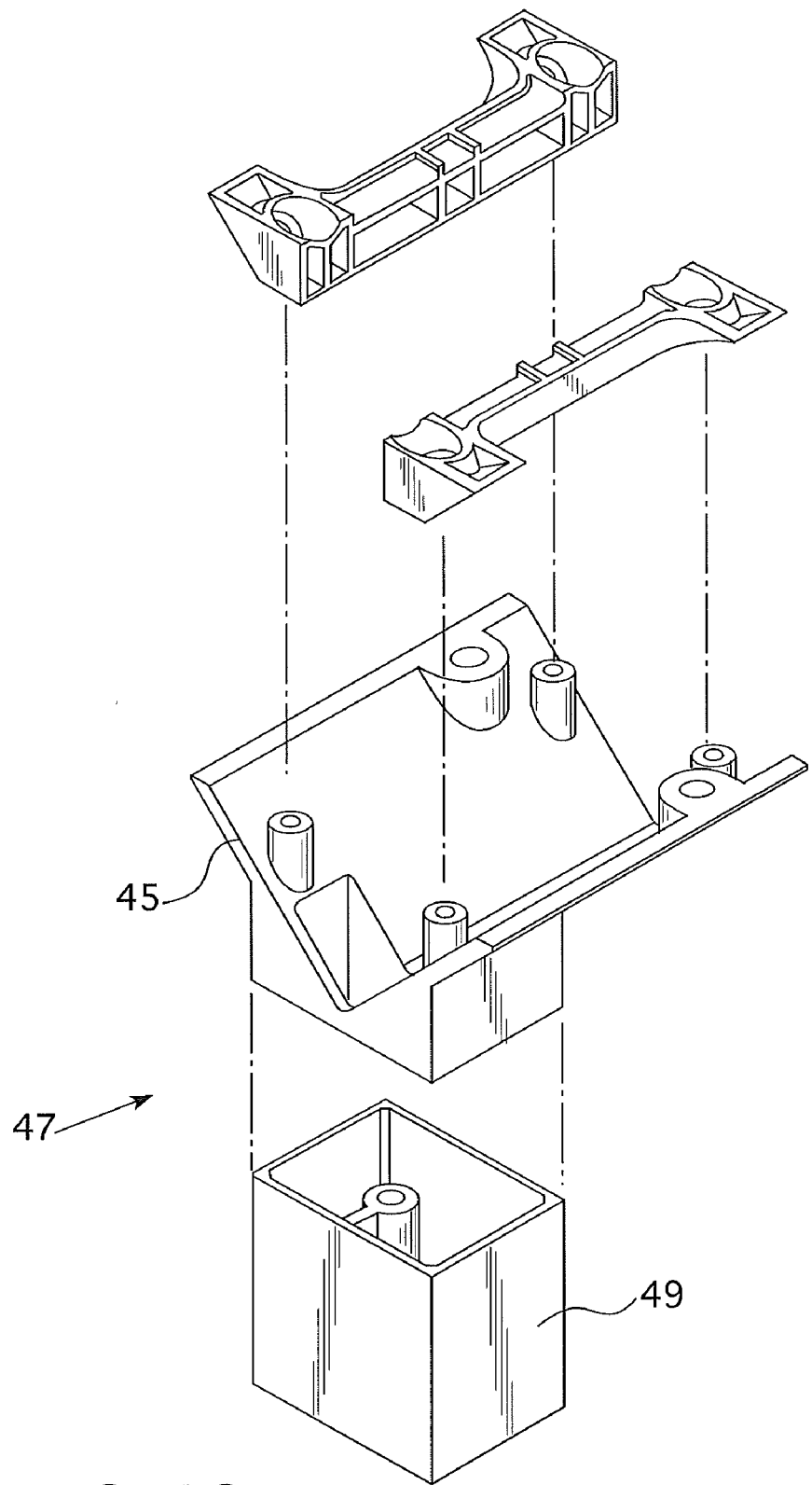
FIG. 18 is an exploded view of a third present preferred fastening mechanism that may be utilized in embodiments of the furniture system.
Figure 19:
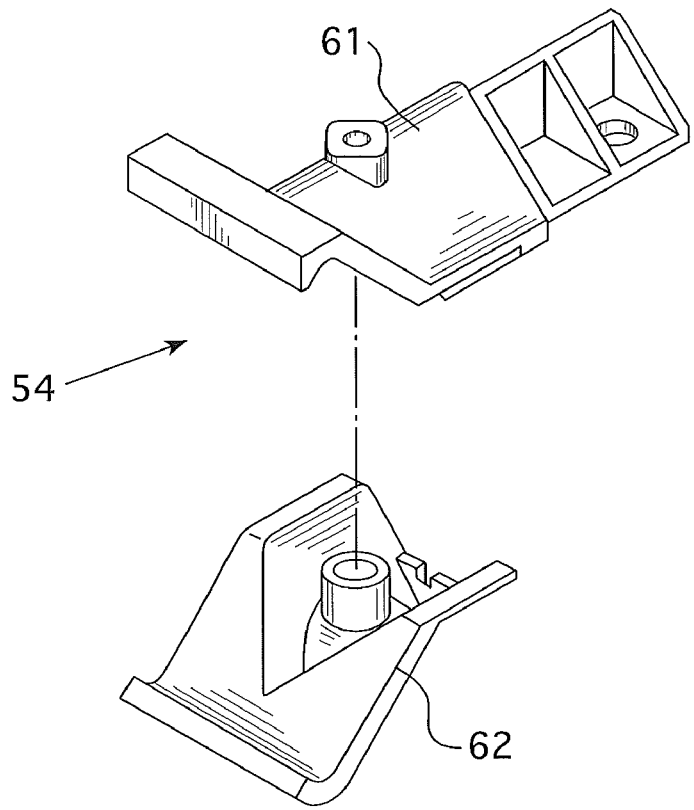
FIG. 19 is an exploded view of a present preferred connection apparatus that may be utilized in embodiments of the furniture system.

Referring to FIGS. 10-11 and 18, another furniture system 41 that may be utilized to define work spaces in rooms or offices may include a work surface 44 that is supported on elongated rails 42. A first end 42a of each rail is received within a channel formed in the body 45 of a respective fastening device 47. A member 49 is attached to a bottom portion of the body 45 below the channel for attaching each fastening device 47 to a support 48. The support 48 may be shelving, a drawer unit, a fence structure or other article of furniture. The lower member 49 may be a portion of a connector assembly.

Magnets or other fastening mechanisms such as adhesive material or fasteners may be utilized to interconnect the fastening devices 47 to the structure 48 via the lower member 49.

A second end 42b of each rail is attached to a respective fastening device 13 to attach the second end 42b of each rail to a support assembly 46. Such a support assembly may be similar to the support assembly 6 discussed above.

As may be appreciated from FIGS. 12-16 and 19, embodiments of the fastening devices and furniture systems may also provide for design flexibility for organizing and constructing work areas. For instance, work surfaces may be positioned in an "L" arrangement that provides for one work surface 58 to be positioned so that its length extends in a direction that is perpendicular to the length of another work surface 57. Preferably, a side of each work surface abuts so that the adjacent work surfaces provide a relatively unitary surface.

The work surface 57 may be supported on rails 2 and support assemblies 6 via fastening devices 13 as discussed above with reference to FIGS. 5-7. The work surface 58 may be supported on rails 52. One end of each rail 52 may be attached to a support assembly 6 via fastening devices 13. The opposite ends of the rails 52 may be attached to a rail 2 via connection apparatuses 54.

Figure 14:
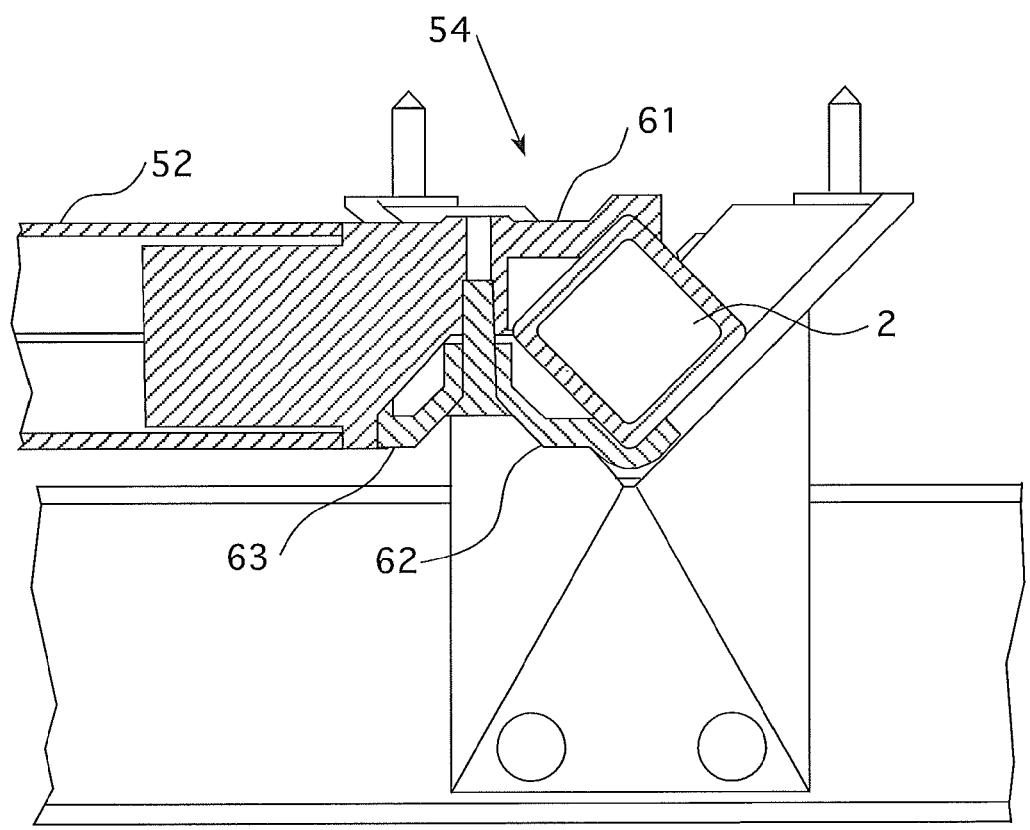
FIG. 14 is a cross section view of line L-L in FIG. 13.

As may best be seen in FIG. 14, each connection apparatus 54 includes an upper jaw portion 61 and a lower jaw portion 62 that are connected to clamp to a portion of a rail 2. The jaw portions are also connected together to form an aperture such as an opening 63. The opening 63 is sized and configured to receive an end of a rail 52. A mouth of the opening 63 faces a direction that is perpendicular to the length of the rail 2 so that the rails 52 may be positioned so that the length of each rail 52 is perpendicular to the length of the rail 2.

Figure 16A:
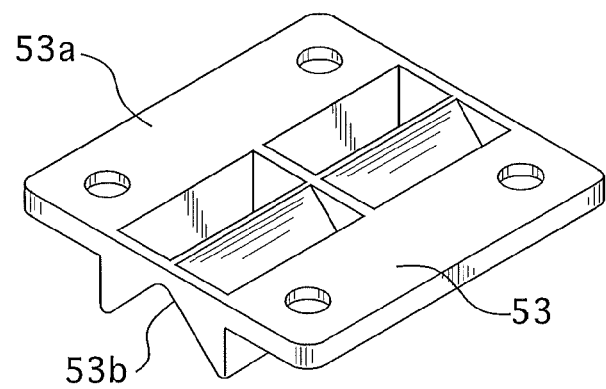
FIG. 16A is a perspective view of a first present preferred bracket that may be used in embodiments of the furniture system.
Figure 16:
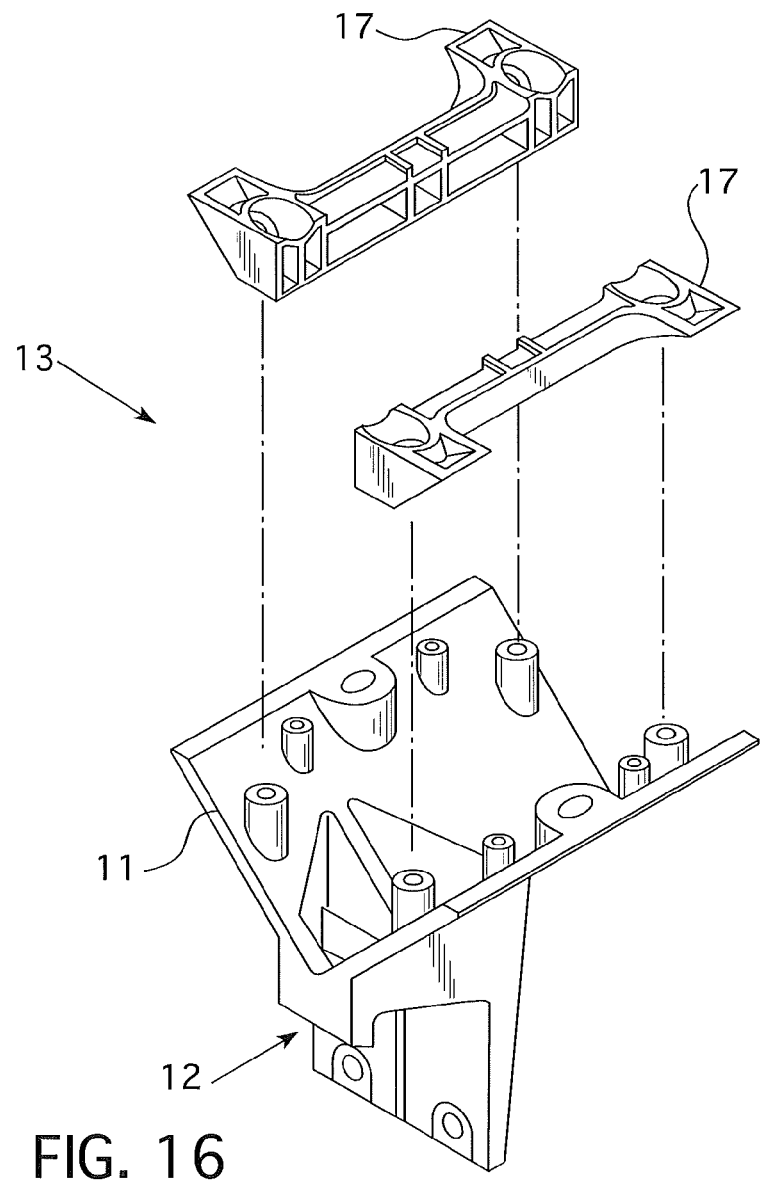
FIG. 16 is an exploded view of a first present preferred fastening device that may be utilized in embodiments of the furniture system.
Figure 17:
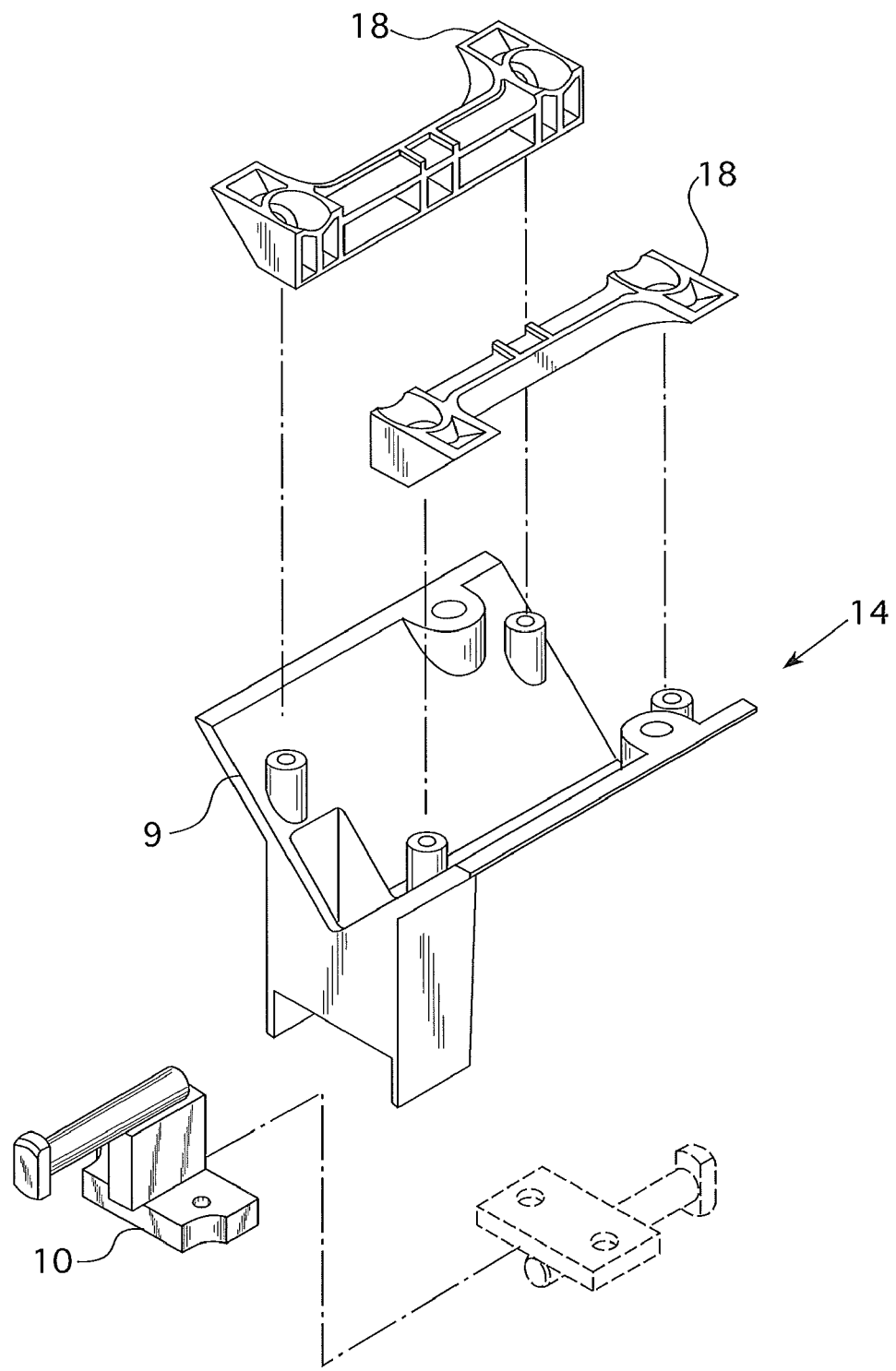
FIG. 17 is an exploded view of a second present preferred fastening device that may be utilized in embodiments of the furniture system. One present preferred connector assembly that may be utilized for that device is shown in dotted line.

As may be seen in FIG. 16A, a bracket 53 may be attached to respective rails 52 or 2. The bracket 53 may include a body that has an upper surface 53a that is substantially flat for supporting a bottom portion of a work surface and an opening 53b sized and configured to receive an upper portion of a rail. The bracket 53 may be positioned below and between the adjacent work surfaces 57 and 58 to support portions of both of the work surfaces. Fasteners may also be used to interconnect the tie bracket returns to each work surface 57 and 58. The upper surface 53a of each bracket may also include a friction inducing surface for maintaining a position of the work surface it is supporting.

Of course, spacers may also be positioned on the rails 52 or 2 for supporting a portion of a work surface as well. The spacers may be attached to one or more rails or positioned on one or more rails for directly engaging the work surface for the rails to support that work surface.

Figure 20:
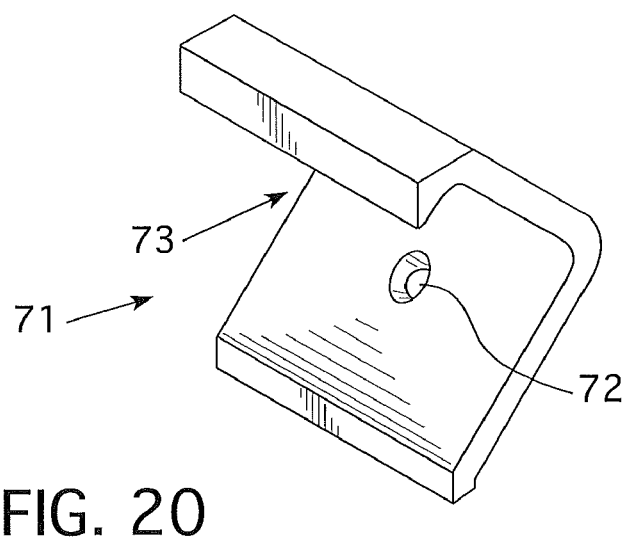
FIG. 20 is a perspective view of a present preferred embodiment of a bracket that may be utilized to interconnect rail elements to furniture components or articles of furniture such as shelving units or drawers.

Referring to FIG. 20, a storage bracket 71 or plurality of storage brackets 71 may also be provided in embodiments of the furniture system. Such storage brackets may be attached to a rail for attaching shelving or other structures or furniture components to the bracket 71 so that those structures may be positioned under a work surface. Each storage bracket may include a hole 72 for a fastener that is configured to attach the furniture component to the rail via one or more of the brackets 71. The brackets may also include a mating portion 73 that defines an opening configured to mate or interlock with a portion of the rail so the bracket 71 may be attached to a rail.

It should be appreciated that variations to the above discussed embodiments may be made to meet a particular design objective. For instance, the size and shape for the bodies of the fastening devices or channels, openings and apertures that may be formed in those bodies may have any of a number of shapes to meet a particular design objective. As another example, the rails may be any of a number of lengths, widths or diameters. As an additional example, different embodiments of the furniture system may utilize one or more embodiments of the fastening devices for interconnecting different furniture components of that system, such as the fastening devices discussed above. As yet another example, the fastening devices or above discussed furniture systems may utilize any of a number of different furniture components or articles that may be attached together via embodiments of the fastening devices.

While certain present preferred embodiments of the furniture system, fastening mechanisms for use in embodiments of that system, and methods of making and using the same have been shown and described above, it is to be distinctly understood that the invention is not limited thereto but may be otherwise variously embodied and practiced within the scope of the following claims.

What is claimed is:

1. A fastening apparatus for interconnecting different furniture components of a furniture system comprising:
   a plurality of fastening devices comprising a first fastening device and a second fastening device,
   the first fastening device having a first body at least partially defining a first channel, the first channel sized and configured to receive a first elongated rail of a first furniture component, the first elongated rail having a length that defines a longest dimension of the first elongated rail, the first channel sized and configured to receive and hold a portion of the first elongated rail such that the first elongated rail is positionable in a substantially horizontal position or horizontal position to support at least a portion of a first work surface, and
   the first fastening device also having a connector assembly, the connector assembly attached to the first body of the first fastening device, the connector assembly having at least one element sized and configured to attach to a second furniture component such that the second furniture component is positionable so that at least one of a length of the second furniture component and a height of the second furniture component extends in a direction that is substantially perpendicular or perpendicular to the length of the first elongated rail when the first elongated rail is in the substantially horizontal position or horizontal position;
   the second fastening device having a second body at least partially defining a second channel, the second channel of the second fastening device sized and configured to receive the first elongated rail of the first furniture component, the second channel of the second fastening device being sized and configured to receive and hold a portion of the first elongated rail such that the first elongated rail is positionable in the substantially horizontal position or horizontal position to support at least a portion of the first work surface, and
   the second fastening device also having an opening formed in the second body of the second fastening device, the opening formed in the second body of the second fastening device being below the second channel of the second fastening device and being sized and configured to receive a portion of a third furniture component such that the third furniture component is positionable so that at least one of a length of the third furniture component and a height of the third furniture component extends in a direction that is substantially perpendicular or perpendicular to the length of the first elongated rail when the first elongated rail is in the substantially horizontal position or horizontal position; and at least one jaw connector, each jaw connector comprising an upper jaw portion, a lower jaw portion and a rail receiving portion, the upper jaw portion spaced apart from the lower jaw portion such that a portion of the first elongated rail is receivable between the upper jaw portion and the lower jaw portion, the upper jaw portion and lower jaw portion being attached to the rail receiving portion, the rail receiving portion having an opening sized and configured to receive an end portion of a second elongated rail, the second elongated rail having a length that defines a longest dimension of the second elongated rail, the end portion of the second elongated rail being receivable within the opening of the rail receiving portion such that the length of the second elongated rail extends in a direction that is perpendicular or substantially perpendicular to the length of the first elongated rail, the end portion of the second elongated rail being positionable in the opening of the rail receiving portion such that the second elongated rail is positionable in a substantially horizontal position or a horizontal position to support at least a portion of a second work surface.

2. The fastening apparatus of claim 1 wherein the third furniture component is a table support assembly or a drawer unit.

3. The fastening apparatus of claim 1 wherein the first body of the first fastening device and the second body of the second fastening device are comprised of metal or a polymeric material, the connector assembly is comprised of metal or a polymeric material, and the first channel has a first end at a first side of the first body and a second end at a second side of the first body that is opposite the first side of the body, and wherein the rail receiving portion defines the opening of the rail receiving portion such that a mouth of the opening of the rail receiving portion faces a direction that is perpendicular to the first end of the first channel and the second end of the first channel.

4. The fastening apparatus of claim 1 wherein the at least one element of the connector assembly is comprised of a first portion and a second portion attached to the first portion, the first portion being sized and configured to mate within an opening defined in the second furniture component, the second portion being sized and configured to be attached within an aperture formed in a portion of the first body, the aperture formed in the first body being positioned below the first channel.

5. The fastening apparatus of claim 4 wherein the second furniture component is a panel component or screen component and wherein at least one fastening mechanism is utilized to fasten the second portion of the connector assembly to the body within the aperture formed in the body.

6. The fastening apparatus of claim 1 wherein the first fastening device is also comprised of at least one clamping member that is positionable within the first channel to engage the portion of the first elongated rail when that portion is held within the first channel.

7. The fastening apparatus of claim 6 wherein the at least one clamping member is sized and configured to directly engage a portion of the first work surface.

8. The fastening apparatus of claim 1 further comprising at least one bracket, the at least one bracket having a body that defines an aperture that is sized and configured to receive and hold a portion of the first elongated rail to support a fourth furniture component from the first elongated rail when the fourth furniture component is attached to the at least one bracket and the at least one bracket is positioned on the first elongated rail.

9. The fastening apparatus of claim 1 wherein the first furniture component is a desk or a table.

10. A method of assembling furniture for a work space comprising:

providing a plurality of first elongated rails, each first elongated rail having a length that defines a longest dimension of that elongated rail, providing a plurality of fastening devices for interconnecting different furniture components, the fastening devices comprising:

a first fastening device having a first body at least partially defining a first channel, the first channel sized and configured to receive a portion of one of the first elongated rails, the first channel sized and configured to receive and hold a portion of the first elongated rail such that the first elongated rail is positionable in a substantially horizontal position to support at least a portion of a first work surface, the first fastening device also having a connector assembly, the connector assembly attached to the first body, the connector assembly having at least one element sized and configured to attach to a second furniture component such that the second furniture component is positionable so that at least one of a length of the second furniture component and a height of the second furniture component extends in a direction that is substantially perpendicular to the length of the first elongated rail when the first elongated rail is in the substantially horizontal position, and a second fastening device having a second body at least partially defining a second channel, the second channel of the second fastening device sized and configured to receive a portion of one of the first elongated rails, the second channel sized and configured to receive and hold a portion of the first elongated rail such that the first elongated rail is positionable in the substantially horizontal position to support at least a portion of the first work surface, the second fastening device also having an opening formed in a second body of the second fastening device, the opening formed in the second body of the second fastening device being below the second channel and being sized and configured to receive a portion of a third furniture component such that the third furniture component is positionable so that at least one of a length of the third furniture component and a height of the third furniture component extends in a direction that is substantially perpendicular to the length of the first elongated rail when the first elongated rail is in the substantially horizontal position, positioning the first elongated rails such that a portion of one of the first elongated rails is positioned in the first channel of the first fastening device and a portion of that elongated rail is positioned in the second channel of the second fastening device;

positioning a first work surface such that the first work surface is at least partially supported by the first elongated rails;

attaching the second furniture component to the first fastening device and the third furniture component to the second fastening device via the connector assembly and the opening formed in the second body so that at least one of a length of the second furniture component and a height of the second furniture component extends in a direction that is perpendicular or substantially perpendicular to the length of the first elongated rails and at least one of a length of the third furniture component and a height of the third furniture component extends in a direction that is substantially perpendicular to the length of the first elongated rails;

providing at least one jaw connector, each jaw connector comprising an upper jaw portion, a lower jaw portion and a rail receiving portion, the upper jaw portion spaced apart from the lower jaw portion such that that a portion of one of the first elongated rails is receivable between the upper jaw portion and the lower jaw portion, the upper jaw portion and lower jaw portion being attached to the rail receiving portion, the rail receiving portion having an opening sized and configured to receive an end portion of a second elongated rail, the second elongated rail having a length that defines a longest dimension of the second elongated rail, the end portion of the second elongated rail being receivable within the opening of the rail receiving portion such that the length of the second elongated rail extends in a direction that is perpendicular to the length of the first elongated rails, the end portion of the second elongated rail being positionable in the opening of the rail receiving portion such that the second elongated rail is positionable in a substantially horizontal position to support at least a portion of a second work surface;

attaching at least one second elongated rail to the receiving portion of the at least one jaw connector; and positioning a second work surface over the at least one second rail such that a side of the second work surface is adjacent to or abuts a side of the first work surface.

11. The method of claim 10 wherein the second furniture component is a panel or a drawer unit and the third furniture component is a panel or a drawer unit.

12. The method of claim 10 wherein the at least one element of the connector assembly is comprised of a first portion and a second portion attached to the first portion, the first portion being sized and configured to mate within an opening defined in the second furniture component, the second portion being sized and configured to be attached within an aperture formed in a portion of the first body of the first fastening device, the aperture formed in the first body of the first fastening device being positioned below the first channel of the first fastening device.

13. The method of claim 10 wherein the at least one element of the connector assembly is comprised of a member sized and configured for positioning between the first body of the first fastening device and the second furniture component for attachment to the second furniture component and wherein at least one fastener is positioned within the second furniture component and the member to attach the member to the second furniture component.

14. The method of claim 10 wherein each of the first elongated rails has a rectangular, circular, polygonal, or square cross section.

15. The method of claim 10 wherein the second furniture component is attached to the first fastening device via the connector assembly of that first fastening device so that the length of the second furniture component and the height of the second furniture component extend in a direction that is substantially perpendicular to the length of the first elongated rails.

16. A furniture system comprising:

a first elongated rail of a first furniture component, the first elongated rail having a length that defines a longest dimension of the first elongated rail;

a plurality of fastening devices comprising a first fastening device and a second fastening device, the first fastening device having a first body at least partially defining a first channel, the first channel sized and configured to receive a first end portion of the first elongated rail, the first channel sized and configured to receive and hold the first end portion of the first elongated rail such that that first elongated rail is positioned in a substantially horizontal position to support at least a portion of a first work surface;

the first fastening device also having a connector assembly attached to the first body, the connector assembly having at least one element sized and configured to attach to a second furniture component such that the second furniture component is positioned so that at least one of a length of the second furniture component and a height of the second furniture component extends in a direction that is substantially perpendicular to the length of the first elongated rail; and a second fastening device having a second body at least partially defining a second channel, the second channel of the second fastening device sized and configured to receive a second end portion of the second elongated rail, the second channel of the second fastening device sized and configured to receive and hold the second end portion of the first elongated rail such that that first elongated rail is positioned in the substantially horizontal position to support at least a portion of the first work surface, the second body of the second fastening device also having an opening formed in the second body of the second fastening device, the opening formed in the second body of the second fastening device being below the second channel of the second fastening device and being sized and configured to receive a portion of a third furniture component such that the third furniture component is positionable so that at least one of a length of the third furniture component and a height of the third furniture component extends in a direction that is substantially perpendicular to the length of the first elongated rail; and the first work surface being at least partially supported by the first rail;

at least one second elongated rail, each of the at least one second elongated rail having a length that defines a longest dimension of that second elongated rail; and at least one jaw connector, each jaw connector comprising an upper jaw portion, a lower jaw portion and a rail receiving portion, the upper jaw portion spaced apart from the lower jaw portion such that that a portion of the first elongated rail is received between the upper jaw portion and the lower jaw portion, the upper jaw portion and lower jaw portion being attached to the rail receiving portion, the rail receiving portion having an opening sized and configured to receive an end portion of the at least one second elongated rail, the end portion of the at least one second elongated rail being received within the opening of the rail receiving portion such that the length of the at least one second elongated rail extends in a direction that is perpendicular to the length of the first elongated rail, the end portion of the at least one second elongated rail being positioned in the opening of the rail receiving portion such that the at least one second elongated rail is positioned in a substantially horizontal position to support at least a portion of a second work surface; and the second work surface supported on the at least one second rail adjacent to the first work surface.

17. The furniture system of claim 16 further comprising at least one bracket, the at least one bracket having a body that defines an aperture that is sized and configured to receive and hold a portion of the first elongated rail to support a fourth furniture component from the first elongated rail when the fourth furniture component is attached to the at least one bracket and the at least one bracket is positioned on the first elongated rail.

18. A furniture system comprising:
- a first elongated rail of a first furniture component, the first elongated rail having a length that defines a longest dimension of the first elongated rail;
- a plurality of fastening device comprising a first fastening device and a second fastening device,
  - the first fastening device having a first body at least partially defining a first channel, the first channel sized and configured to receive a first end portion of the first elongated rail, the first channel sized and configured to receive and hold the first end portion of the first elongated rail such that that first elongated rail is positioned in a substantially horizontal position to support at least a portion of a first work surface;
  - the first fastening device also having a connector assembly attached to the first body, the connector assembly having at least one element sized and configured to attach to a second furniture component such that the second furniture component is positioned so that at least one of a length of the second furniture component and a height of the second furniture component extends in a direction that is substantially perpendicular to the length of the first elongated rail; and
  - the second fastening device having a second body at least partially defining a second channel, the second channel of the second fastening device sized and configured to receive a second end portion of the first elongated rail, the second channel of the second fastening device sized and configured to receive and hold the second end portion of the first elongated rail such that that first elongated rail is positioned in the substantially horizontal position to support at least a portion of the first work surface,
- the second body of the second fastening device also having an opening formed in the second body of the second fastening device, the opening formed in the second body of the second fastening device being below the second channel of the second fastening device and being sized and configured to receive a portion of a third furniture component such that the third furniture component is positionable so that at least one of a length of the third furniture component and a height of the third furniture component extends in a direction that is substantially perpendicular to the length of the first elongated rail; and the first work surface being at least partially supported by the first rail;
- a first jaw connector comprising an upper jaw portion, a lower jaw portion and a rail receiving portion, the upper jaw portion spaced apart from the lower jaw portion such that a portion of the first elongated rail is receivable between the upper jaw portion and the lower jaw portion, the upper jaw portion and lower jaw portion being attached to the rail receiving portion, the rail receiving portion having an opening sized and configured to receive an end portion of a second elongated rail to retain that end portion, the second elongated rail having a length that defines a longest dimension of the second elongated rail, the end portion of the second elongated rail being receivable within the opening of the rail receiving portion of the first jaw connector such that the length of the second elongated rail extends in a direction that is perpendicular or substantially perpendicular to the length of the first elongated rail, the end portion of the second elongated rail being positionable in the opening of the rail receiving portion of the first jaw connector such that the second elongated rail is positionable in a substantially horizontal position or a horizontal position to support at least a portion of a second work surface; and
- a second jaw connector comprising an upper jaw portion, a lower jaw portion and a rail receiving portion, the upper jaw portion of the second jaw connector spaced apart from the lower jaw portion of the second jaw connector such that a portion of the first elongated rail is receivable between the upper jaw portion and the lower jaw portion of the second jaw connector, the upper jaw portion and lower jaw portion of the second jaw connector being attached to the rail receiving portion of the second jaw connector, the rail receiving portion of the second jaw connector having an opening sized and configured to receive an end portion of a third elongated rail to retain that end portion, the third elongated rail having a length that defines a longest dimension of the third elongated rail, the end portion of the third elongated rail being receivable within the opening of the rail receiving portion of the second jaw connector such that the length of the third elongated rail extends in a direction that is perpendicular or substantially perpendicular to the length of the first elongated rail, the end portion of the third elongated rail being positionable in the opening of the rail receiving portion of the second jaw connector such that the third elongated rail is positionable in a substantially horizontal position or a horizontal position to support at least a portion of the second work surface.

* * * * *